United States Patent
Hill et al.

(10) Patent No.: US 7,366,581 B2
(45) Date of Patent: Apr. 29, 2008

(54) REPLACE FACE OPERATOR FOR SOLID BODY MODELING

(75) Inventors: Kenneth Jamieson Hill, South Lyon, MI (US); Richard Stephen Brandt, Ann Arbor, MI (US)

(73) Assignee: Autodesk, Inc., San Rafael, CA (US)

( * ) Notice: Subject to any disclaimer, the term of this patent is extended or adjusted under 35 U.S.C. 154(b) by 466 days.

(21) Appl. No.: 10/947,585

(22) Filed: Sep. 22, 2004

(65) Prior Publication Data

US 2005/0038540 A1 Feb. 17, 2005

Related U.S. Application Data

(63) Continuation-in-part of application No. 10/663,391, filed on Sep. 16, 2003, now Pat. No. 7,031,790.

(60) Provisional application No. 60/504,888, filed on Sep. 22, 2003, provisional application No. 60/504,887, filed on Sep. 22, 2003, provisional application No. 60/412,935, filed on Sep. 23, 2002.

(51) Int. Cl.
*G06F 19/00* (2006.01)

(52) U.S. Cl. ...................... 700/118; 700/182

(58) Field of Classification Search .................. 700/97, 700/98, 117–120, 159–163, 180–189
See application file for complete search history.

(56) References Cited

U.S. PATENT DOCUMENTS

| | | | | |
|---|---|---|---|---|
| 5,649,084 A | * | 7/1997 | Ernst | 345/630 |
| 5,861,889 A | * | 1/1999 | Wallace et al. | 345/619 |
| 5,894,310 A | * | 4/1999 | Arsenault et al. | 345/679 |
| 6,307,555 B1 | * | 10/2001 | Lee | 345/423 |
| 6,392,645 B1 | * | 5/2002 | Han et al. | 345/420 |
| 6,525,745 B1 | * | 2/2003 | Phelan et al. | 345/676 |
| 6,654,654 B1 | * | 11/2003 | Subrahmanyam et al. | 700/98 |
| 6,867,771 B2 | * | 3/2005 | Kripac | 345/420 |
| 6,924,800 B2 | * | 8/2005 | Iwata et al. | 345/420 |
| 7,065,242 B2 | * | 6/2006 | Petrov et al. | 382/154 |
| 7,092,859 B2 | * | 8/2006 | Wang et al. | 703/2 |
| 2003/0201992 A1 | * | 10/2003 | Wang et al. | 345/420 |
| 2004/0257362 A1 | * | 12/2004 | Venkataraman et al. | 345/420 |

* cited by examiner

*Primary Examiner*—M. N. Von Buhr
(74) *Attorney, Agent, or Firm*—Gates & Cooper LLP

(57) ABSTRACT

A computer-implemented solid modeling system performs a replace face operation on a solid body by selecting one or more outgoing faces on the solid target body and replacing the selected faces with one or more incoming faces from an operator body. The selected faces on the target body may comprise a single face, a set of adjacent faces or a set of disjoint faces. The selected faces on the operator body may comprise one single-sided face or one or more sheets, wherein a sheet is an edge-connected set of double-sided faces.

45 Claims, 14 Drawing Sheets

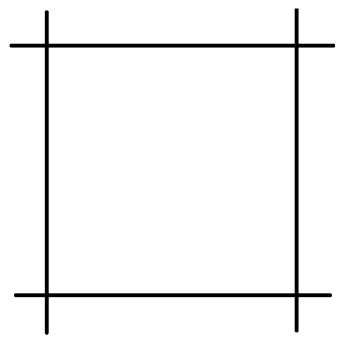 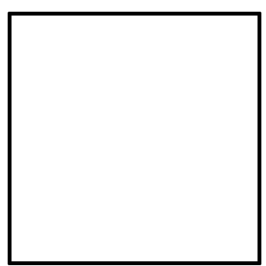 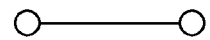
FIG. 18  FIG. 19  FIG. 20
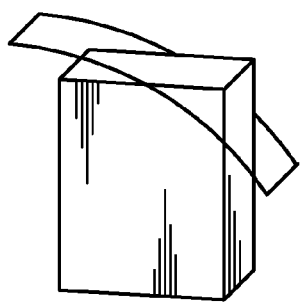 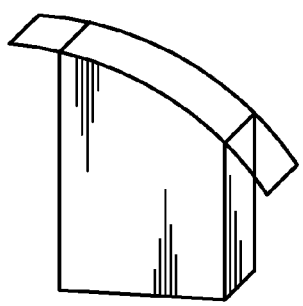
FIG. 21A  FIG. 21B
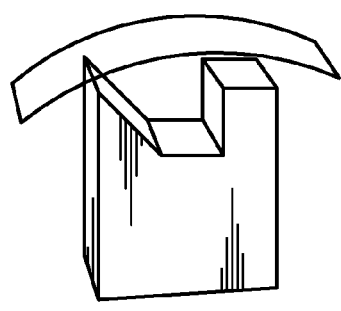 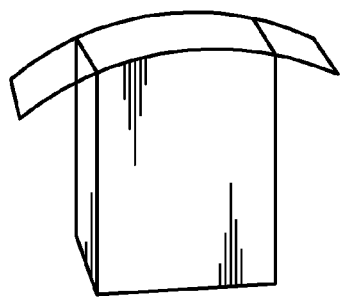
FIG. 22A  FIG. 22B

REPLACE FACE OPERATOR FOR SOLID BODY MODELING

CROSS-REFERENCE TO RELATED APPLICATIONS

This application claims the benefit under 35 U.S.C. §119 (e) of the following commonly-assigned U.S. patent applications:

U.S. Provisional Patent Application Ser. No. 60/504,887, filed on Sep. 22, 2003, by Kenneth J. Hill and Richard S. Brandt, entitled "REPLACE FACE OPERATOR FOR SOLID BODY MODELING,"; and U.S. Provisional Patent Application Ser. No. 60/504,888, filed on Sep. 22, 2003, by Lucia Casu and Kenneth J. Hill, entitled "OPERATOR FOR EMBOSSING AND ENGRAVING PROFILES IN A SOLID BODY MODELING SYSTEM,"

which applications are incorporated by reference herein.

This application is a continuation-in-part and claims the benefit under 35 U.S.C. §120 of the following commonly-assigned U.S. patent applications:

U.S. Utility patent application Ser. No. 10/663,391, filed on Sep. 16, 2003, by Kenneth J. Hill, entitled "OPERATOR FOR SCULPTING SOLIDS WITH SHEET BODIES," now U.S. Pat. No. 7,031,790, issued Apr. 18, 2006, which claims the benefit under 35 U.S.C. §119(e) of commonly assigned U.S. Provisional Patent Application Ser. No. 60/412,935, filed on Sep. 23, 2002, by Kenneth J. Hill, entitled "OPERATOR FOR SCULPTING SOLIDS WITH SHEET BODIES," and U.S. Utility patent application Ser. No. 10/946,713, filed on Sep. 22, 2004, by Lucia Casu and Kenneth J. Hill, entitled "OPERATOR FOR EMBOSSING AND ENGRAVING PROFILES IN A SOLID BODY MODELING SYSTEM," which application claims the benefit under 35 U.S.C. §119 (e) of commonly assigned U.S. Provisional Patent Application Ser. No. 60/504,888, filed on Sep. 22, 2003, by Lucia Casu and Kenneth J. Hill, entitled "OPERATOR FOR EMBOSSING AND ENGRAVING PROFILES IN A SOLID BODY MODELING SYSTEM,"

which applications are incorporated by reference herein.

BACKGROUND OF THE INVENTION

1. Field of the Invention

The present invention relates generally to computer-assisted design (CAD) systems, and in particular, to a graph-based method for replacing faces on a solid body with faces from a sheet body.

2. Description of the Related Art

Over the last decade, designers have changed their fundamental approach to graphics design, moving from two-dimensional (2D) drawing systems to three-dimensional (3D) solid modeling systems. New software makes solid modeling technology available and affordable to virtually anyone.

Solid modeling is a technique that allows designers to create dimensionally accurate 3D solid models in a 3D space represented within a computer, rather than traditional 2D drawings. 3D solid models include significantly more engineering data than 2D drawings, including the volume, bounding surfaces, and edges of a design.

With the graphics capabilities of today's computers, these 3D solid models may be viewed and manipulated on a monitor. In addition to providing better visualization, 3D solid models may be used to automatically produce 2D drawing views, and can be shared with manufacturing applications and the like.

Some 3D solid modeling systems generate parametric feature-based models. A parametric feature-based model is comprised of intelligent features, such as holes, fillets, chamfers, etc. The geometry of the parametric feature-based model is defined by underlying mathematical relationships (i.e., parameters) rather than by simple unrelated dimensions, which makes them easier to modify. These systems preserve design intent and manage it after every change to the model.

An operation that is needed by solid modeling systems is the ability to replace one or more faces of a solid body. However, such an operation is non-trivial. Nonetheless, the present invention satisfies this need.

SUMMARY OF THE INVENTION

To address the requirements described above, the present invention discloses a computer-implemented solid modeling system that performs a replace face operation on a target body (e.g., a solid body) by selecting one or more outgoing faces on the target body and replacing the selected faces with one or more incoming faces from an operator body (e.g., a sheet body or alternatively a "hollowed out" solid body where all the faces are made double-sided).

The selected faces on the target body may comprise a single face, a set of adjacent faces or a set of disjoint faces. The selected faces on the operator body may comprise a single two-sided face or one or more sheets, wherein a sheet is an edge-connected set of double-sided faces.

In one embodiment, the selected faces on the target body comprise multiple contiguous faces, and the selected faces on the operator body comprise a single face. In another embodiment, the selected faces on the target body comprise multiple discontinuous faces, and the selected faces on the operator body comprise a single face. In yet another embodiment, the selected faces on the target body comprise a single face, and the selected faces on the operator body comprise a multiple contiguous faces. In still another embodiment, the selected faces on the target body comprise multiple contiguous faces, and the selected faces on the operator body comprise a single face within a composite sheet.

In addition to the selected faces, one or more remaining faces on the target body may be extended, trimmed, or both trimmed and extended. Generally, the remaining faces on the target body are adjacent to the selected faces on the target body, and are extended and/or trimmed using the selected faces on the operator body.

BRIEF DESCRIPTION OF THE DRAWINGS

Referring now to the drawings in which like reference numbers represent corresponding parts throughout:

FIG. 18 shows the cellular topology of a solid and an intersecting set of four sheets;

FIG. 19 shows how two solid cells are created, one inside the other;

FIG. 20 illustrates a cellular topology graph for FIG. 18;

FIGS. 21A-B and 22A-B are "before" (21A and 22A) and "after" (21B and 22) examples, respectively, of the operation and results of a replace face operator;

DETAILED DESCRIPTION OF THE PREFERRED EMBODIMENTS

In the following description, reference is made to the accompanying drawings which form a part hereof, and which is shown, by way of illustration, an embodiment of the present invention. It is understood that other embodiments may be utilized and structural changes may be made without departing from the scope of the present invention.

Overview

The present invention is a parametric, feature-based solid modeling system that provides a replace face operator on a target body (e.g., a solid body) by selecting one or more outgoing faces on the target body and replacing the selected faces with one or more incoming faces from an operator body (e.g., a sheet body or alternatively a "hollowed out" solid body where all the faces are made double-sided).

The selected faces on the target body may comprise a single face, a set of adjacent faces or a set of disjoint faces. The selected faces on the operator body may comprise a single two-sided face or one or more sheets, wherein a sheet is an edge-connected set of double-sided faces.

In one embodiment, the selected faces on the target body comprise multiple contiguous faces, and the selected faces on the operator body comprise a single face. In another embodiment, the selected faces on the target body comprise multiple discontinuous faces, and the selected faces on the operator body comprise a single face. In yet another embodiment, the selected faces on the target body comprise a single face, and the selected faces on the operator body comprise a multiple contiguous faces. In still another embodiment, the selected faces on the target body comprise multiple contiguous faces, and the selected faces on the operator body comprise a single face within a composite sheet.

In addition to the selected faces, one or more remaining faces on the target body may be extended, trimmed, or both trimmed and extended. Generally, the remaining faces on the target body are adjacent to the selected faces on the target body, and are extended and/or trimmed using the selected faces on the operator body.

Hardware and Software Environment

Figure 1:
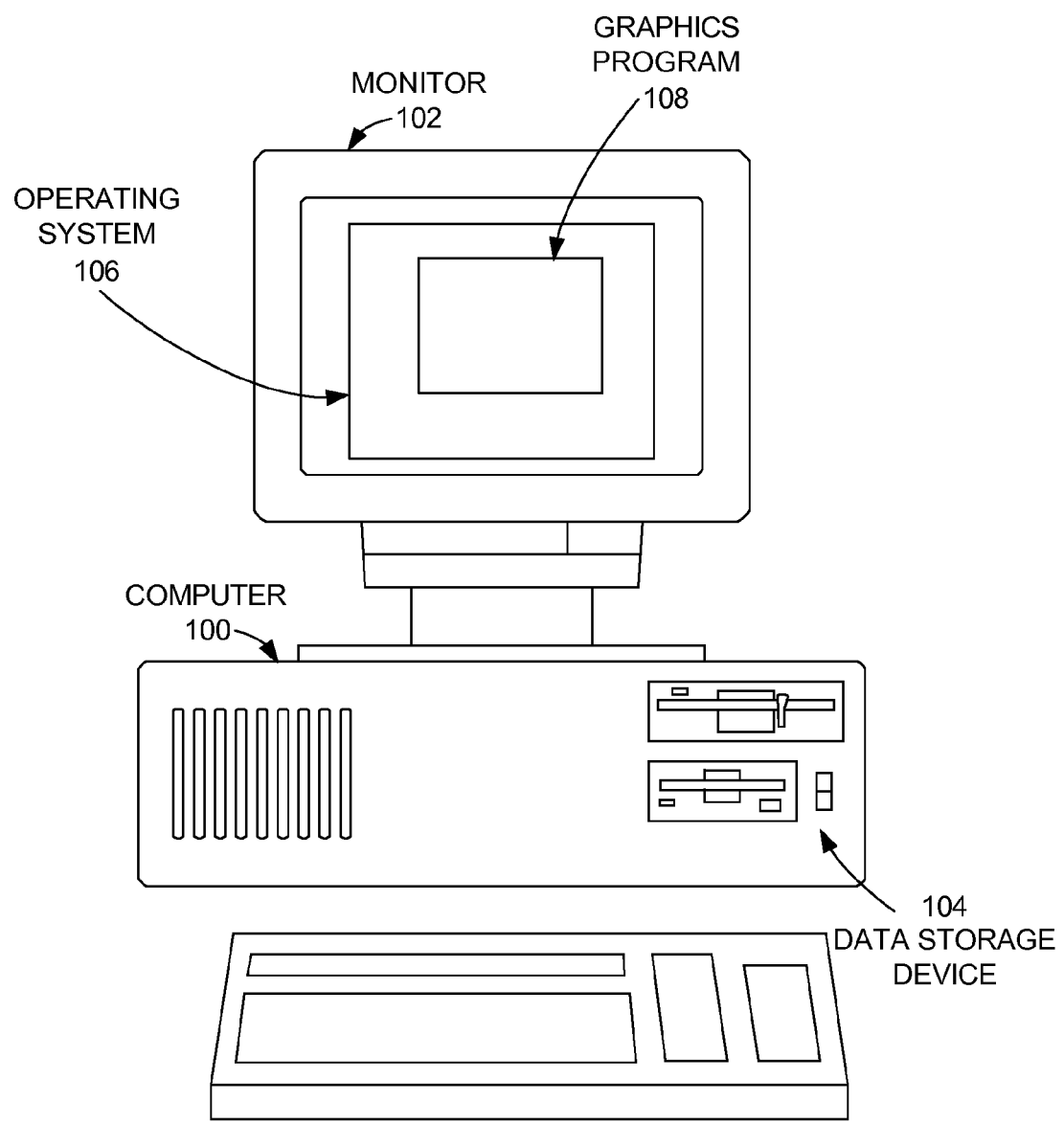
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108, which is also represented by a window displayed on the monitor 102, that operates under the control of the operating system 106. The graphics program 108 preferably comprises a parametric feature-based solid modeling system, although other graphics programs 108 could be used as well.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
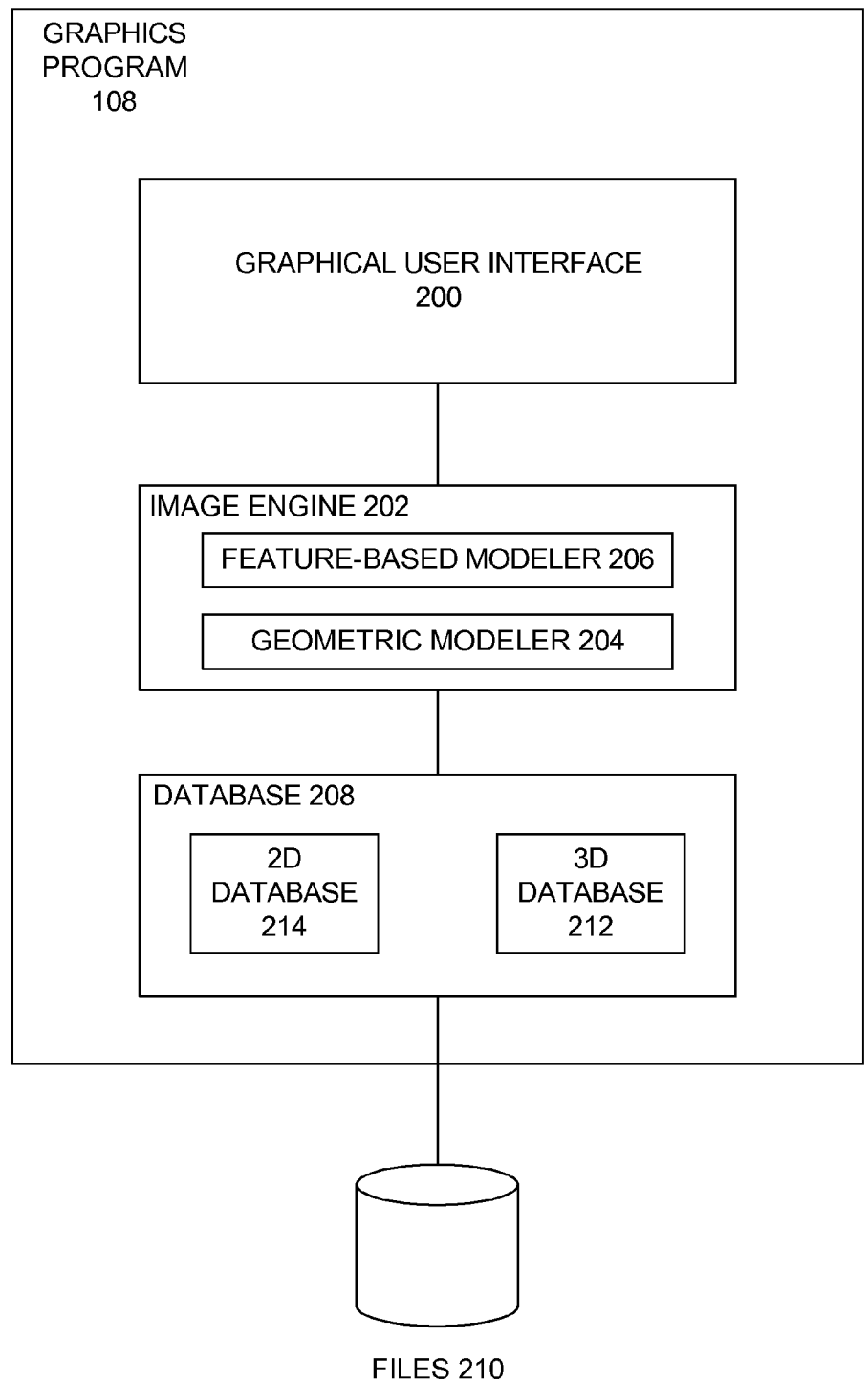
FIG. 2 is a block diagram that illustrates the components of the graphics program 108 according to the preferred embodiment of the present invention.

FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202 including a Geometric Modeler (GM) 204 and Feature-Based Modeler (FM) 206, and a Database (DB) 208 for storing objects in files 210.

The Graphical User Interface 200 displays information to the user and provides the functionality for the user's interaction with the graphics program 108.

The Image Engine 202 processes the Database 208 or files 210 and delivers the resulting graphics to an output device. In the preferred embodiment, the Image Engine 202 provides a complete application programming interface (API) that allows other computer programs to interface to the graphics program 108 as needed.

The Geometric Modeler 204 primarily creates geometry and topology for models. The Feature-Based Modeler 206, which interacts with the Geometric Modeler 204, is a parametric feature-based solid modeler that integrates 2D and 3D mechanical design tools, including parametric assembly modeling, surface modeling, 2D design, and associative drafting. The Feature-Based Modeler 206 provides powerful solid-, surface-, and assembly-modeling functionality.

The Database 208 is comprised of two separate types of databases: (1) a 3D database 212 known as the "world space" that stores 3D information; and (2) one or more 2D databases 214 known as the "virtual spaces" or "view ports" that stores 2D information derived from the 3D information. The 3D database 212 captures the design intent and behavior of a component in a model.

Object Structure

Figure 3:
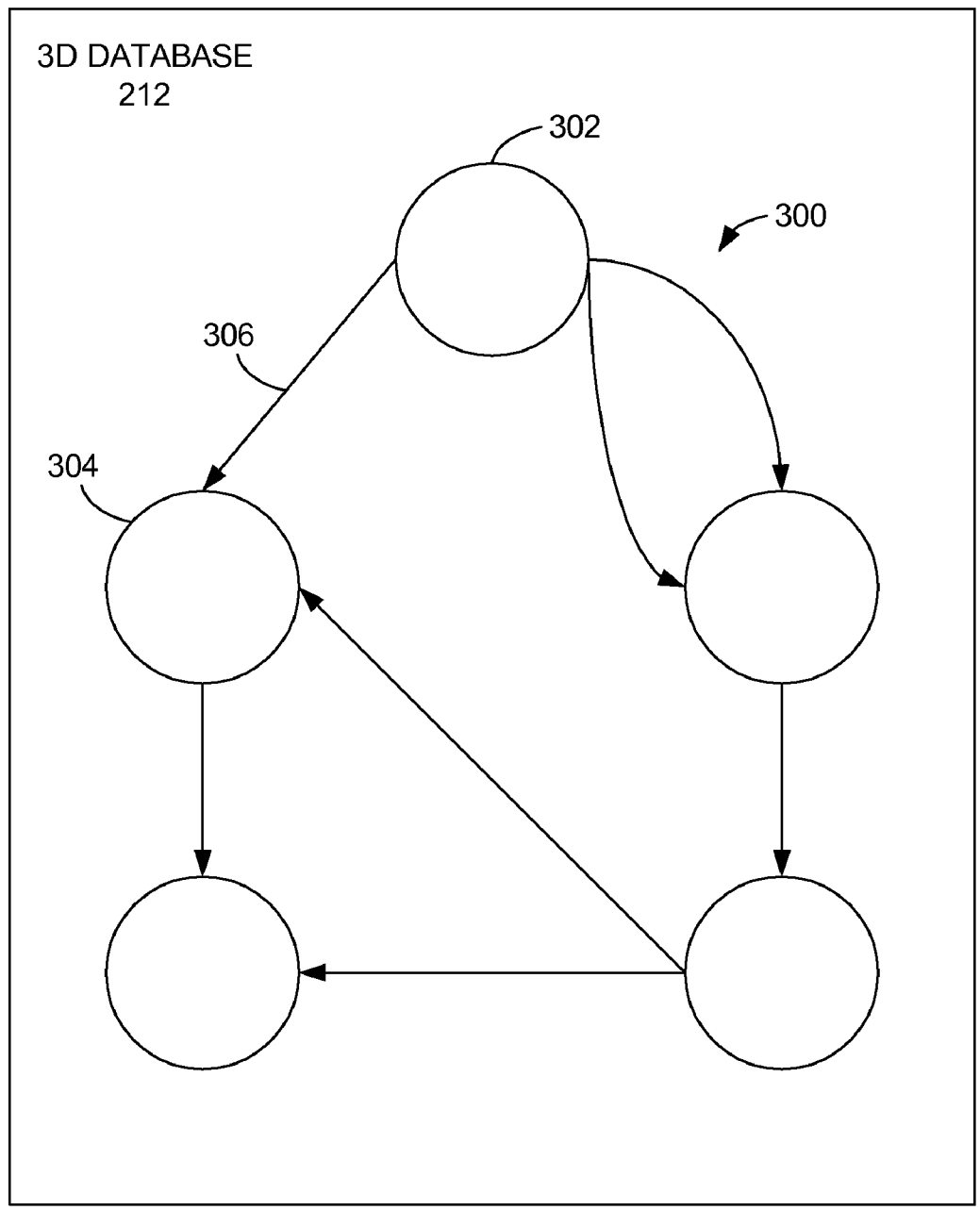
FIG. 3 is a block diagram that illustrates an object structure maintained by a three dimensional database according to the preferred embodiment of the present invention.

FIG. 3 is a block diagram that illustrates an object structure 300 maintained by the 3D database 212 according to the preferred embodiment of the present invention. Each object structure 300 includes a header node 302 and usually includes one or more nodes 304 connected by zero or more edges 306. There may be any number of different object structures 300 maintained by the 3D database 212. Moreover, a node 304 may be a member of multiple structures 300 in the 3D database 212.

Operation of the Preferred Embodiment

Boundary Representations (B-Reps)

A solid is represented in the Feature-Based Modeler 206 by means of a boundary representation (b-rep) model. The boundary representation comprises a hierarchy of topological objects that define the boundaries of successively simpler elements of the model.

Each solid is comprised of disconnected parts called "lumps." Most solids have only one lump, although most boundary representation models allow solids to have multiple lumps.

Figure 4:
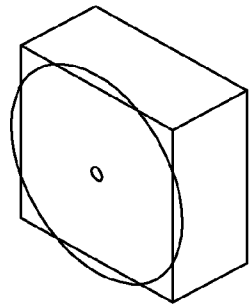
FIG. 4 illustrates how multi-lump bodies can be created.
Figure 5:
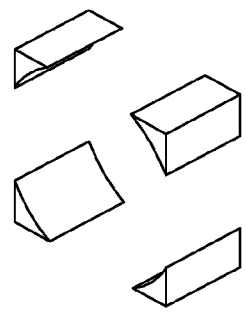
FIG. 5 illustrates a multi-lump body.

FIGS. 4 and 5 illustrate how multi-lump bodies can be created. For example, in FIG. 4, a circular profile could be extruded through a body with a "cut" operation. The result is the multi-lump body of FIG. 5.

Each lump contains one or more "shells." These shells are comprised of a collection of faces that separates the inside portion of the lump from the outside. A lump can have several shells. There is typically an exterior shell which bounds the infinite void from the material, but there may also be interior shells which separate the material from pockets of empty space.

Each shell contains a set of one or more "faces." These faces are the infinitely thin boundaries between what is inside the solid and what is outside. A spherical lump might have only one face (on the one shell), or its surface might be chopped up into a patchwork of faces. A cube typically has six faces, but could have more if some of the sides are split. Each face is required to be smooth in the sense that there are no sharp ridges in the interior of the face. Underlying each face is a surface that represents the geometry associated with the face. The surface gives the face structure.

In some b-rep models, there is a topological entity called a "half-face" that determines what side of the face is considered outside of the lump. Other b-rep models describe half-faces as special faces. When half-faces are present, the shells are comprised of half-faces, and the half-faces are associated to a face.

Each face is bounded by zero or more loops. A loop is to a face what a shell is to a lump. A spherical face might have no loops. The side of a block typically has one loop. A side of a cube with a round hole in it has two loops: one for the square outer boundary of the face, one for the round hole.

Each loop is comprised of multiple "half-edges" (often called "co-edges" or "fins"). These half-edges represent the usage of an edge (the next lower topological item) by a face. The half-edge answers the question "does the loop traverse an edge in the same parametric direction of the edge, or in the reverse direction?"

Associated with each half-edge is an "edge." An edge can be thought of as being an infinitely thin wire. Each edge has a direction of traversal based on the underlying mathematical equation of the curve associated with the edge.

Edges are bounded by zero, one, or two "vertices." Vertices connect a physical point as a termination to an edge.

Figure 6:
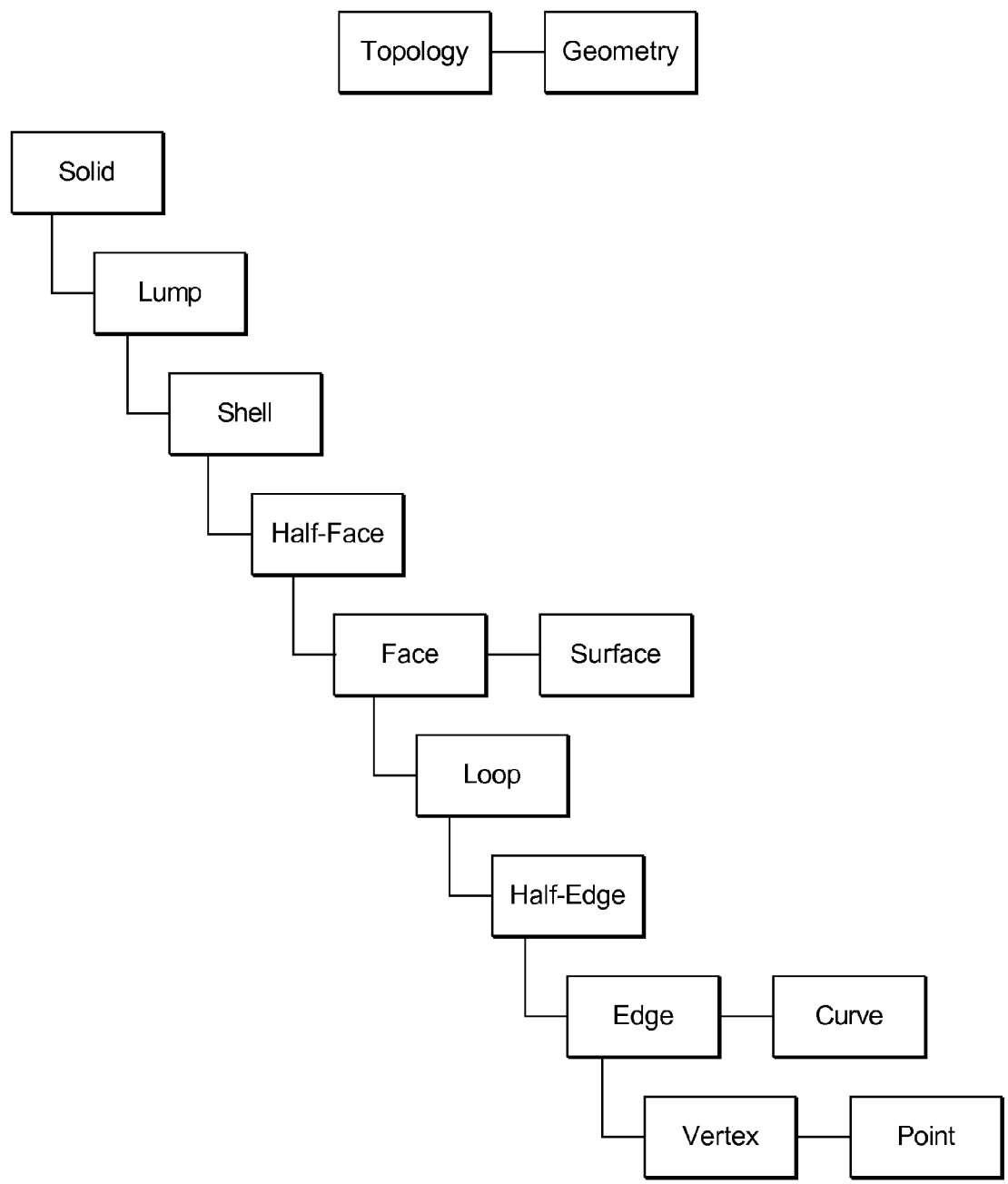
FIG. 6 is a topology chart of a hierarchy of topological entities used to represent a solid and their associated geometry entities.

The topology chart of FIG. 6 shows the hierarchy of topological entities used to represent a solid and their associated geometry entities: solid, lump, shell, half-face, face/surface, loop, half-edge, edge/curve, and vertex/point.

A sheet may also be defined using a boundary representation. Unlike a solid, a sheet is infinitely thin and has no volume. In some modelers, each face in a sheet has two half-faces (one for each side); in other modelers, each face is marked as a double-sided.

Attributes

The Feature-Based Modeler 206 has the ability to attach data to topological entities. Each such datum is usually called an "attribute." Attributes typically have programmable behaviors so that they can respond appropriately to common operations such as splitting, merging, copying, or transforming the entity to which they are attached.

For example, to track how a certain face is split during a Boolean operation, an attribute can be placed on that face with the following behaviors:

Split behavior: Each resultant face gets a copy of the attribute.

Merge behavior: If either of the two faces being merged has the attribute, then the resultant face has a copy of the attribute.

Copy behavior: This behavior is not usually encountered in a Boolean operation.

Transform behavior: This behavior is not usually encountered in a Boolean operation.

After the Boolean operation is completed, all faces are examined to see which ones contain the attribute.

Suppose that the system needs to track two faces, one of type A and one of type B. An attribute could be created for each type to track, but a more compact way of doing it is to create an attribute (perhaps called AttribFaceTrack) with two Boolean data members (data items containing true or false values). These data members can be distinct bits of a single machine word, for example, wherein the first bit indicates whether the face is of type A, and the second bit indicates whether the face is of type B. The merge behavior could then be changed so that if each of the merging faces has an attribute of type AttribFaceTrack but with different faces indicated, the attribute on the resultant face has both faces indicated. After the Boolean operation, some faces will have no attribute of type AttribFaceTrack, some will have type A indicated, some will have type B indicated, and others will possibly have type A and B indicated.

This multi-face tracking behavior will be used in a slightly more complex form to perform the replace face operator of the present invention.

Cellular Topology

When speaking of the physical world, one expects that two bodies will not occupy the same space at the same time. In the symbolic world, there is no such restriction. When solids intersect, space is divided into the following types of disjoint regions: regions that are outside of both bodies (called "the void"); regions that are inside the first body, but outside the second; regions that are inside the second body, but outside the first; and regions that are inside both bodies. The disjoint regions, interior to at least one of the solids, are called "cells." There may be more than one cell of the same type.

Figure 7:
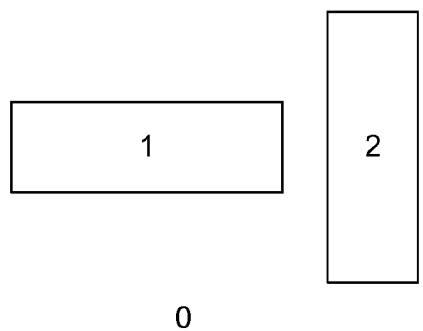
FIG. 7 illustrates how, in two dimensions, two disjoint regions form three types of regions (marked 0, 1, 2)
Figure 8:
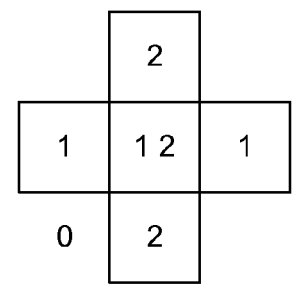
FIG. 8 illustrates how four types of regions are formed when the regions intersect.

FIG. 7 illustrates this concept. In two dimensions, two disjoint regions form three types of regions (marked 0, 1, 2). FIG. 8 illustrates how four types of regions are formed when the regions intersect. Moreover, five cells are formed in FIG. 8.

Two cells are called "adjacent" if they share at least one common face. In the two dimensional analogs that will be frequently used herein for illustration purposes (e.g. FIG. 8), cells will be adjacent when separated by a common edge.

Figure 9:
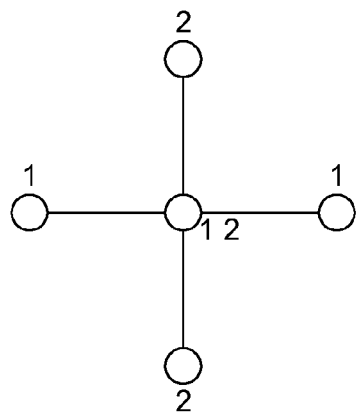
FIG. 9 is a cellular topology graph for FIG. 8.

From the cells of intersecting bodies and the notion of adjacency, one may use graph theory to generate a useful abstraction of the connectivity of the cells. Let each cell (other than the void cells) be represented as a vertex on the graph (not to be confused with the b-rep vertices) and let two vertices be connected by an edge (again, not a b-rep edge) if and only if the cells associated with those vertices are adjacent. The resulting graph is called a "cellular topology graph" or simply a "ct-graph." For example, FIG. 9 is a ct-graph for FIG. 8.

One can augment the ct-graphs by labeling the vertices by their kind: 1 if the associated cell is in the first body, 2 if in the second body, and 1,2 if the associated cell is in both bodies.

Selective Boolean Operations on Two Solid Bodies

A "Boolean operation" between two bodies creates a new solid from portions of each body, wherein the body being modified is called the "blank body," and the body doing the modification is called the "tool body." After a "join" Boolean operation, the blank body is modified to contain all the material from both the original blank body and the tool body. After a "subtract" Boolean operation, the entire material interior to the tool body is removed from the blank body. An "intersect" Boolean operation replaces the blank body with only that material which is in both the tool body and the original blank body.

Each of the Boolean operations types presented above can be represented in terms of cellular topology. The system creates the ct-graph for the intersecting bodies, and then decides which vertices of the ct-graph to keep. If a particular vertex present in the resulting ct-graph is kept, then its associated cell is present in the resulting solid. In this application, the convention is that the tool body is associated with the "1" vertices and the blank body is associated with the "2" vertices.

Figure 10:
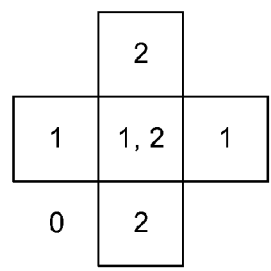
FIG. 10 illustrates two-dimensional intersecting bodies.
Figure 11:
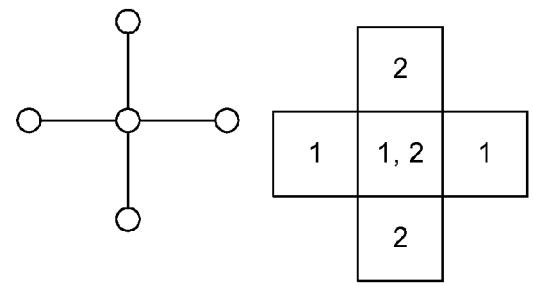
FIG. 11 illustrates how a join operation keeps all cells in a cellular topology graph.
Figure 12:
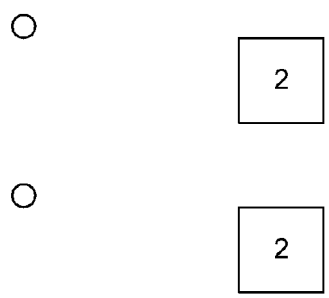
FIG. 12 illustrates how a subtract operation keeps only the type 2 vertices.
Figure 13:
FIG. 13 illustrates how an intersect operation keeps only the 1, 2 vertex.

FIGS. 10, 11, 12 and 13 illustrate these operations. FIG. 10 illustrates the 2D intersecting bodies, FIG. 11 illustrates how a join operation keeps all cells in the ct-graph, FIG. 12 illustrates how a subtract operation keeps only the "2" vertices, and FIG. 13 illustrates how an intersect operation keeps only the "1,2" vertex.

Figure 14:
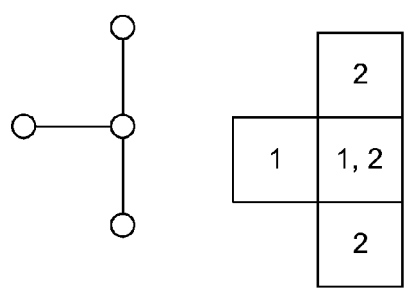
FIG. 14 illustrates a selective Boolean removing only one cell.

There may be times when operations other than the three above are needed. When this is occurs, an algorithm may choose to do a "selective Boolean" in which the algorithm explicitly selects which vertices (and therefore which cells) are kept. For example, perhaps it is desired to keep all the cells except the right "1" vertex. Removing one vertex from the ct-graph can do this, as shown in FIG. 14, which illustrates a selective Boolean removing only one cell.

Selective Boolean Operations on Two Sheet Bodies

A selective Boolean on two sheet bodies produces a ct-graph, wherein the vertices represent cells and the edges represent the connectivity between the cells. The cells are not bounded regions of space as in the solid selective Boolean, but rather bounded subsets of the original sheets.

As in the description of selective Boolean operations on two solid bodies, selective Boolean operations on sheets can be described using planar analogs. Curves on the plane represent cells and hence are vertices in the ct-graph, while the junctions between these curves are the connective entities and therefore represent the edges of the ct-graph.

Figure 15:
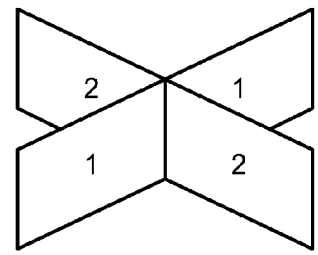
FIG. 15 shows the cellular topology of two intersecting (edge aligned) sheets.
Figure 16:
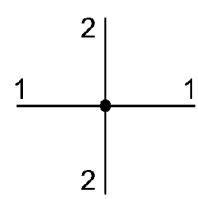
FIG. 16 shows a two-dimensional analog of FIG. 15.
Figure 17:
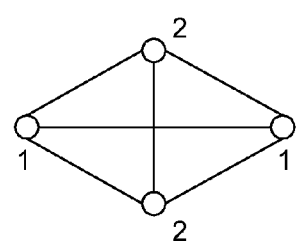
FIG. 17 is a cellular topology graph for the configuration of FIG. 15.

For example, FIG. 15 shows the cellular topology of two intersecting (edge aligned) sheets. FIG. 16 shows a 2D analog of FIG. 15 and FIG. 17 is a ct-graph for the configuration of FIG. 15. Note that each face in FIG. 15 connects to every other face (through the edge of intersection), and thus the ct-graph of FIG. 17 is fully connected.

Selective Boolean Operations on One Solid and One Sheet Body

When a selective Boolean operation is performed on a solid body and a sheet body, the faces of the sheet body may separate the solid into regions of space such that the regions are separated from each other by faces from the sheet body.

This can be discussed using a 2D analog. Solid bodies are represented in 2D as regions and sheet bodies as curves.

FIG. 18 shows the cellular topology of a solid and an intersecting set of four sheets. Each line within the cube represents an individual sheet body. The analogous 3D figure would contain an outer cube, and six intersecting planar faces bounding an inner cube.

FIG. 19 shows how two solid cells are created, one inside the other. Notice that the portions of the sheet body that did not contribute to the separation (the "overhangs") have been removed. The outer cell has a square hole in it, the inner cell precisely fills the hole. For the analogous 3D figure, there would be a cubical cell with a cubical void in its center, and another smaller cubical cell that precisely fills that void.

FIG. 20 illustrates a ct-graph for FIG. 18.

Replace Face Operator

The replace face operator is performed by the Feature-Based Modeler 206 by the user selecting one or more outgoing faces on the target body and replacing the selected faces on the target body with one or more incoming faces from the operator body.

The selected faces on the target body may comprise a single face, or a set of adjacent faces, or a set of disjoint faces, and the selected faces on the operator body may comprise a single face or multiple adjacent faces, or potentially even multiple disjoint sets of faces.

EXAMPLES

FIGS. 21A-21B and 22A-22B are "before" (FIGS. 21A and 22A) and "after" (FIGS. 21B and 22B) examples, respectively, of the operation and results of the replace face operator. In each example, the user selects two sets of faces: a set of outgoing faces to be replaced, and a set of incoming faces that take the place of the replaced faces.

In FIG. 21A, the set of outgoing faces comprises the top face of the target body (i.e., the sold body) and the set of incoming faces comprises the operator body (i.e., the sheet) above the target body, which results in the new object shown in FIG. 21B. In FIG. 22A, the set of outgoing faces comprises the operator body (i.e., the sheet) above the target body (i.e., the solid body) and the set of incoming faces comprises the top face of the target body, which results in the new object shown in FIG. 22B.

Note that, in the above examples, the outgoing faces are replaced, while some of the remaining faces were extended, some were trimmed, and some were both trimmed and extended. The replace face operator finds all faces and edges that are adjacent to the existing faces, and attempts to trim and/or extend them with the new faces.

Face Extension

Faces that must be extended to complete the replacement are crucial to the success of the operator, because the Feature-Based Modeler 206 may not be able to extend a face sufficiently to complete the replacement. In fact, there are a number of situations that fail in the replace face operator.

Figure 23:
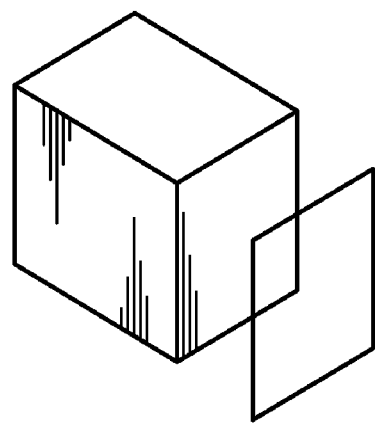
FIG. 23 illustrates a first example that fails in the replace face operator.

FIG. 23 illustrates a first example that fails in the replace face operator. The set of outgoing faces is the top face of the target body (i.e., the solid body), but it is perpendicular to the set of incoming faces of the operator body (i.e., the sheet), which comprise the replacement face shown separate from and to the right of the target body. The edges that are adjacent to the top face are all parallel to the replacement face, so they cannot be extended to reach the replacement face.

Figure 24:
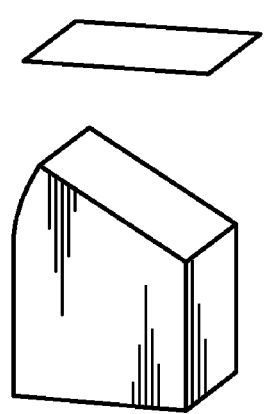
FIGS. 24 and 25 illustrate a second example that fails in the replace face operator.

FIG. 24 illustrates a second example that fails in the replace face operator. The set of outgoing faces comprises the top face of the target body (i.e., the solid body), but it is adjacent to a cylindrical face of the target body, and the cylindrical face does not intersect the set of incoming faces of the operator body (i.e., the sheet), which comprises the replacement face shown separate from and above the target body, no matter how far it is extended, as shown in FIG. 25.

Figure 25:
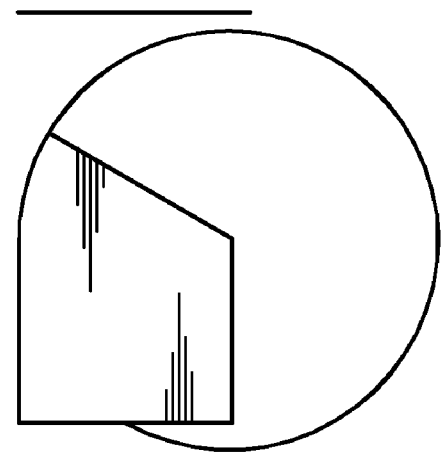

Alternate embodiments of this invention may choose to extend the cylindrical face of FIG. 25 in a different manor, including extending it with a planar face tangent to the cylindrical face. With this alternate extension type the replace face operator will succeed. Such alternate extension methods can be implemented within the scope of this invention.

Generally, if a face fails to extend to the replacement faces, an error message will be displayed by the Feature-Based Modeler 206.

Outgoing Faces from the Target Body

Figure 26:
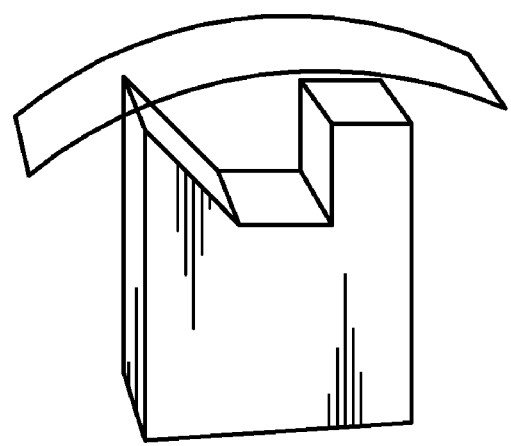
FIGS. 26 and 27 illustrate an example of multiple faces of the target body being replaced by faces from an operator body.
Figure 27:
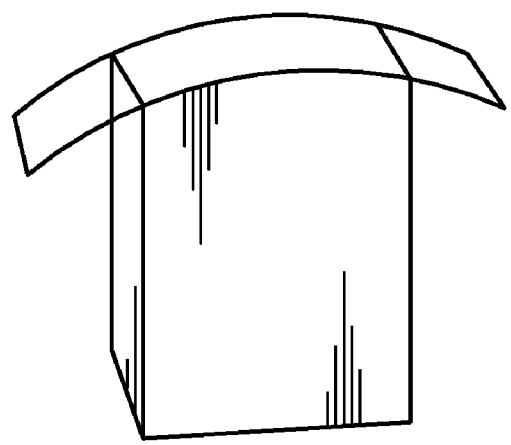

The outgoing faces may be contiguous. FIG. 26 shows an initial target body (i.e., the solid body) with an operator body (i.e., the sheet) positioned above the target body, wherein the set of outgoing faces comprises the multiple contiguous faces on the top of the target body and the set of incoming faces comprises the entire operator body positioned above the target body. FIG. 27 shows the results of the replace face operation.

Figure 28:
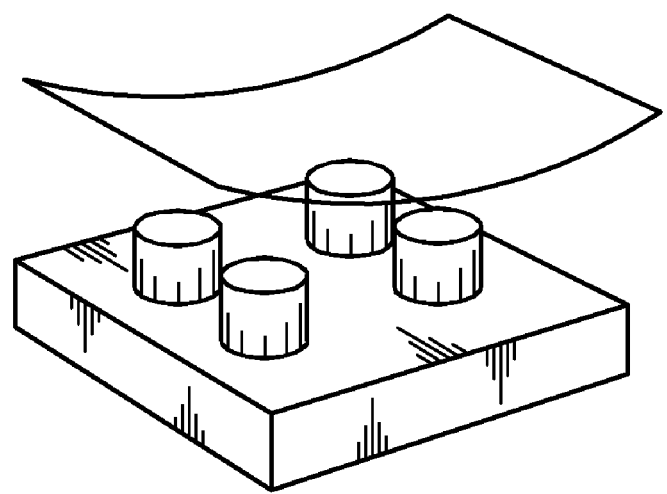
FIGS. 28 and 29 illustrate an example of multiple discontinuous faces being replaced by faces from an operator body.
Figure 29:
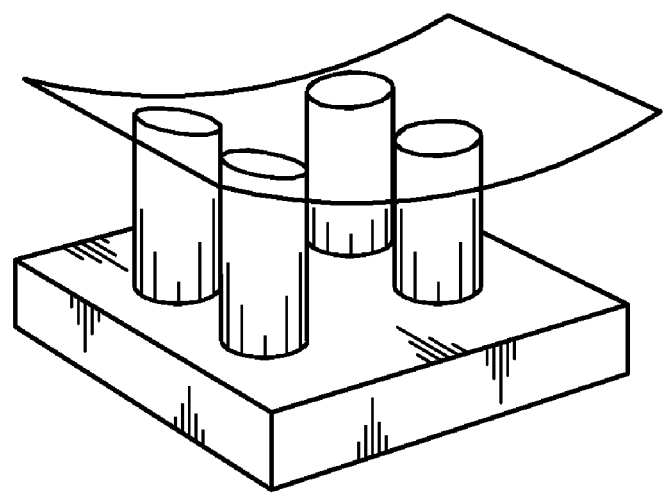

The selected outgoing faces may be disjoint. FIG. 28 shows an initial target body (i.e., the solid body) with an operator body (i.e., the sheet) positioned above it, wherein the set of outgoing faces comprises multiple, discontinuous faces of the tops of the cylinders extending from the top of the target body, and the set of incoming faces comprises the entire sheet of the operator body positioned above the target body. FIG. 29 shows the results of the replace face operation.

Furthermore, any combination of disjoint and contiguous outgoing faces may be selected.

Figure 30:
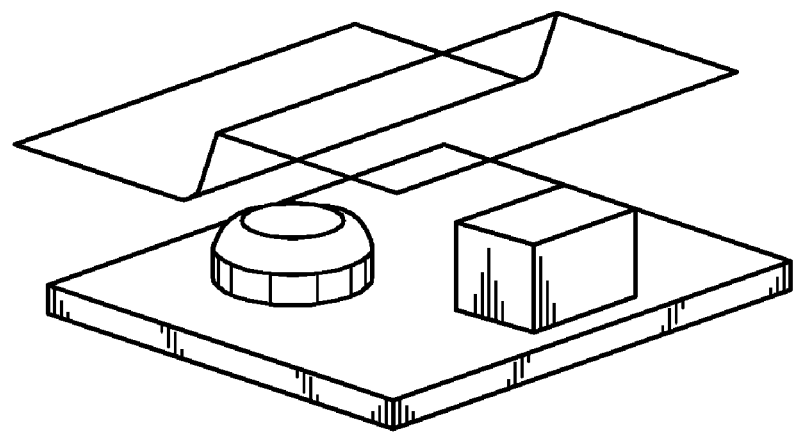
FIGS. 30 and 31 illustrate an example in which a replace face operation is performed with multiple discontinuous faces that are replaced by multiple faces on an operator body.
Figure 31:
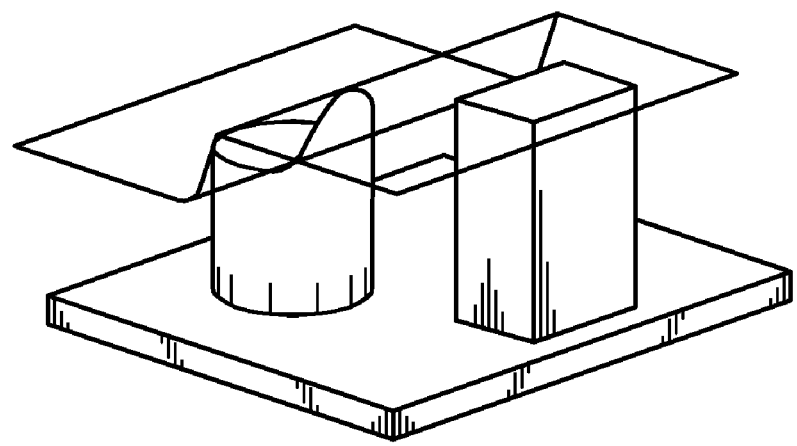

FIG. 30 shows an initial target body (i.e., the solid body) with an operator body (i.e., the sheet) positioned above the target body, wherein the set of outgoing faces comprises multiple, discontinuous faces of the top of the cylinder extending from the top of the base plate and the top face of the cube object extending from the top of the base plate, and the set of incoming faces comprises the operator body positioned above the target body. FIG. 31 shows the results of the replace face operation.

Incoming Faces from the Operator Body

Figure 32:
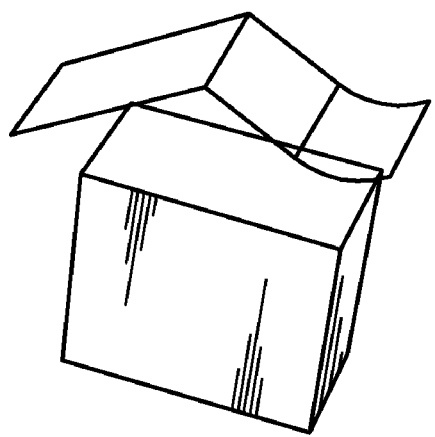
FIGS. 32 and 33 illustrate an example in which the operator body contains multiple faces.
Figure 33:
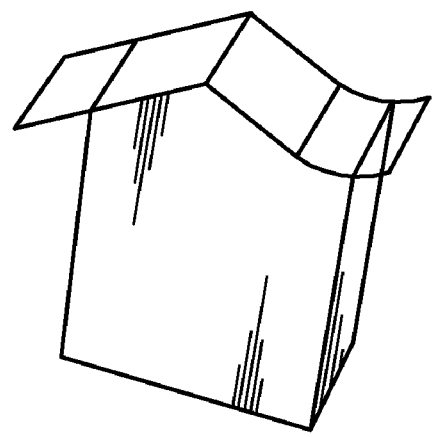

The incoming faces from the operator body may also be comprised of any combination of contiguous and disjoint faces. FIG. 32 shows an initial target body (i.e., the solid body) with an operator body (i.e., the sheet) positioned above the target body, wherein the set of outgoing faces comprises the top face of the target body, and the set of incoming faces comprises the entire operator body positioned above the target body. FIG. 33 shows the results of the replace face operations.

Logic of the Replace Face Algorithms

Figure 34:
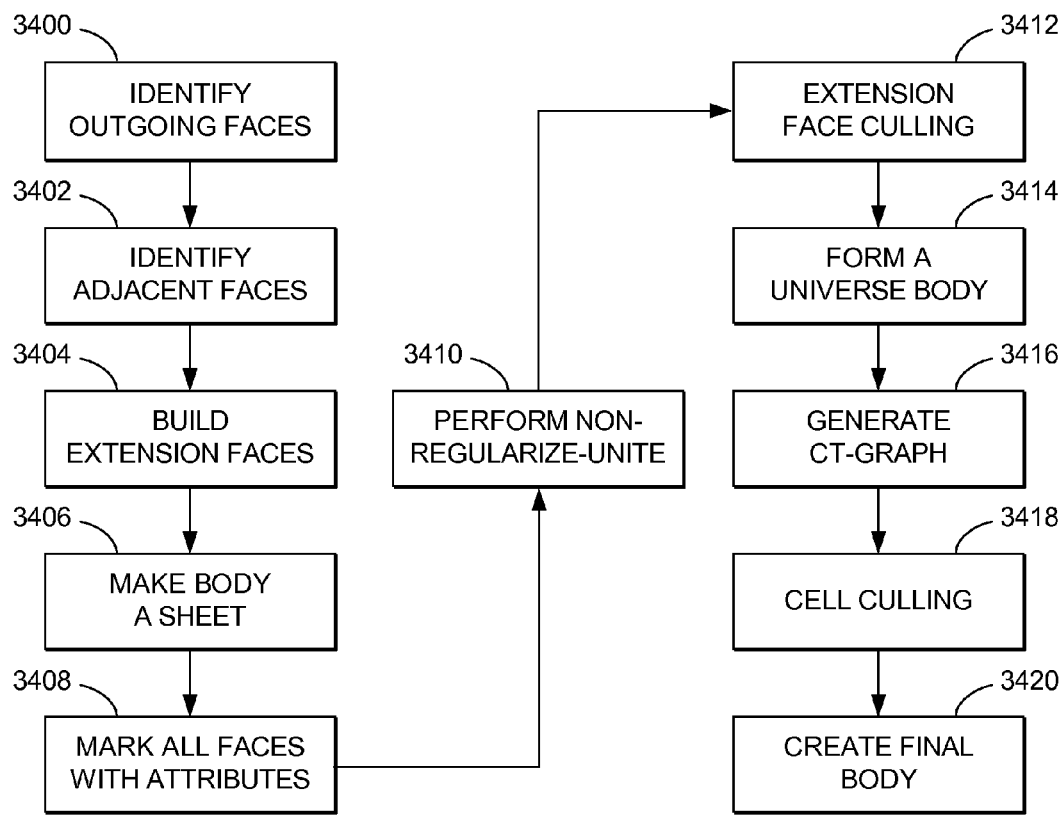
FIG. 34 is a flowchart that illustrates the logic performed by the Replace Face operator according to the preferred embodiment of the present invention.

FIG. 34 is a flowchart that illustrates the logic performed according to the preferred embodiment of the present invention.

Block 3400 represents the step of identifying outgoing faces of the target body.

Block 3402 represents the step of identifying all faces of the target body that are adjacent to the outgoing faces.

Block 3404 represents the step of building extension faces for the identified faces to a bounding box of the operator body. Some embodiments of this invention may extend the adjacent faces by extracting contiguous sets of adjacent faces as a sheet body, and extending the sheet as a unified whole. The sheet extensions would then only occur along edges that are on exactly one face.

Block 3406 represents the step of making the target body a sheet, by making all the faces double-sided. This essentially turns the solid body comprising the target body into an empty shell.

Block 3408 represents the step of marking all the faces of the target body, the extension faces, and incoming and outgoing faces of the target body and the operator body with distinguishing attributes to identify the faces according to their origin and purpose. These attributes must have merge and split semantics which migrate the attributes properly during the following Boolean operation. After the Boolean operation, each face must know where it came from. Classifications include: Part Face, Incoming Face, Outgoing Face and Extension Face. A face that receives an Outgoing Face attribute will also have a Part Face attribute. An Extension Face attribute will record (via a pointer) the original Part Face from which it was extended.

Block 3410 represents the step of performing a non-regularized-unite on the faces of the target body, the incoming faces of the operator body, and the extension faces of the target body. The result of this Boolean operation is a collection of faces that have split each other, which is known as the web body.

Block 3412 represents the step of simplifying the web body by eliminating the extension faces wherever possible by performing extension face culling. The only extension faces to be kept are ones that are needed to connect the original (unextended) face to the incoming face. Specifically, this Block extends connected quilts of faces (i.e., sheets) to a target sheet.

Block 3414 represents the step of forming a universe body large enough to completely enclose the web body.

Block 3416 represents the step of generating a ct-graph from the web body and universe body, wherein this operation is also known as a first stage of the selective Boolean operation. This Block is described in more detail below as Pre-Processing Logic in FIG. 35.

Block 3418 represents the step of examining the ct-graph to determine what cells to keep and what cells to discard by performing cell culling, in order to generate a final graph (i.e., a graph of cells to keep) for the resulting solid body. This Block is described in more detail below as the Cell Culling in FIG. 36.

Block 3420 represents the step of performing a "second stage" of the selective Boolean operation in order to create a final body from the final graph.

Pre-Processing Logic

Figure 35:
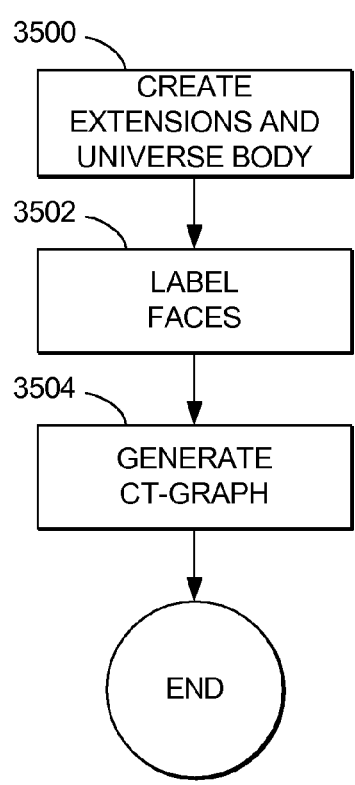
FIG. 35 is a flowchart that illustrates the logic performed by Pre-Processing Logic according to the preferred embodiment of the present invention.

FIG. 35 is a flowchart that illustrates in more detail the logic performed according to the preferred embodiment of the present invention.

Block 3500 represents creating adjacent face extensions and universe body.

Block 3502 represents the step of labeling faces in the web and universe bodies. All faces in the web body are marked with an attribute that identifies them as being part of the web body, and all faces on the universe body are marked with an attribute that identifies them as being part of the universe body. The behavior of these attributes are set so that as faces are split and merged back together, the algorithm will be able to identify where they originally came from.

Block 3504 represents generating the ct-graph and cellular topology (i.e., the first stage of the selective Boolean operation).

Cell Culling

Figure 36:
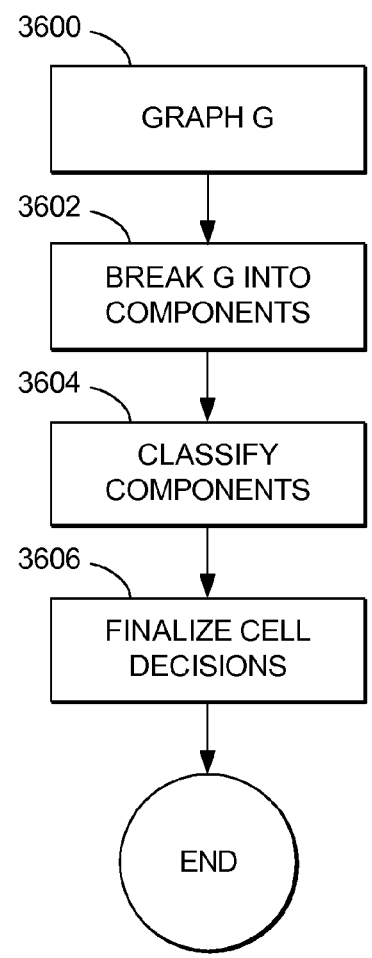
FIG. 36 is a flowchart that illustrates the logic performed by Cell Culling according to the preferred embodiment of the present invention.

FIG. 36 is a flowchart that illustrates the logic performed according to the preferred embodiment of the present invention.

Block 3600 represents the parameters that are passed to this logic, which includes the graph G from the first stage of the selective Boolean operation.

Block 3602 represents the step of breaking the graph G into one or more components. This Block produces G/P from the graph G, wherein G/P has certain graph edges removed in order to break the graph G into components. Specifically, graph edges that represent faces marked "Part Face" (described in block 3408 of FIG. 34) on the original target body or collections of faces, at least one of which is marked "Part Face" are removed.

Block 3604 represents the step of classifying the components in the G/P into "IN" or "OUT" categories.

Note that this is performed using a meta-graph, in a manner similar to that described in U.S. Utility patent application Ser. No. 10/663,391, filed on Sep. 9, 2003, by Kenneth J. Hill, entitled "OPERATOR FOR SCULPTING SOLIDS WITH SHEET BODIES," which application claims the benefit under 35 U.S.C. §119(e) of co-pending and commonly assigned U.S. Provisional Patent Application Ser. No. 60/412,935, filed on Sep. 23, 2002, by Kenneth J. Hill, entitled "OPERATOR FOR SCULPTING SOLIDS WITH SHEET BODIES," which applications are incorporated by reference herein. Specifically, refer to the discussion associated with Block 2610 and FIGS. 27, 28, 29, 30 and 31, and the text associated with Block 2612 and FIGS. 32 and 33, in U.S. Utility patent application Ser. No. 10/663,391, filed on Sep. 9, 2003, by Kenneth J. Hill, entitled "OPERATOR FOR SCULPTING SOLIDS WITH SHEET BODIES," -US-U1, which application claims the benefit under 35 U.S.C. §119(e) of co-pending and commonly assigned U.S. Provisional Patent Application Ser. No. 60/412,935, filed on Sep. 23, 2002, by Kenneth J. Hill, entitled "OPERATOR FOR SCULPTING SOLIDS WITH SHEET BODIES," which applications are incorporated by reference herein.

Block 3606 represents the step of finalizing the cell decisions and building a final graph representing the resulting solid body. In the graphs used for this logic, graph vertices represent bounded volumes called "cells", and graph edges represent one or more model faces that separate the volumes. For IN components, cells that have both incoming and outgoing faces, are reclassified OUT. For OUT components, cells which have both incoming and outgoing faces, are reclassified IN. Finally, any remaining IN cell that is adjacent to an OUT cell through a set of faces, none of which is marked "Part Face" or "Incoming Face", is marked OUT. Once these cell decisions have been made the final solid is constructed as the union of all the cells marked IN. This is the second stage of the selective Boolean.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or system for manipulating solid bodies in a solid modeling system could benefit from the present invention. A computer program other than a solid modeling system, including perhaps a 2D drawing program (wherein the bodies are, in fact, similar to the example figures contained herein) could benefit from this invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for modifying a solid body in a computer-implemented solid modeling system, comprising:
   (a) performing a replace face operation on a target body by selecting one or more outgoing faces on the target body and replacing the selected faces with one or more incoming faces from an operator body, the replace face operation comprising:
      identifying the outgoing faces of the target body;
      identifying all faces of the target body that are adjacent to the outgoing faces;
      building extension faces for the identified faces to a bounding box of the operator body;
      making the target body a sheet by making all faces double-sided;
      marking all the faces of the target body, the extension faces of the target body, and incoming and outgoing faces of the target body and the incoming faces of the operator body with distinguishing attributes to identify the faces according to their origin and purpose;
      performing a non-regularized-unite on the outgoing faces of the target body, the incoming faces of the operator body, and the extension faces of the target body, in order to create a web body;
      simplifying the web body by eliminating the extension faces wherever possible by performing extension face culling;
      forming a universe body large enough to completely enclose the web body;
      generating a cellular topology graph, (ct-graph) from the web body and the universe body;
      examining the ct-graph to determine what cells to keep and what cells to discard by performing cell culling, in order to create a final graph; and
      creating a final body from the final graph; and
   (b) storing or displaying the created final body.

2. The method of claim 1, wherein the target body is a solid body.

3. The method of claim 1, wherein the operator body is a sheet body.

4. The method of claim 1, wherein the operator body is a solid body.

5. The method of claim 1, wherein the selected faces on the target body comprise a single face.

6. The method of claim 1, wherein the selected faces on the target body comprise a set of adjacent faces.

7. The method of claim 1, wherein the selected faces on the target body comprise a set of disjoint faces.

8. The method of claim 1, wherein the incoming faces on the target body comprise a single double-sided face.

9. The method of claim 1, wherein the incoming faces on the operator body comprise one or more sheets, wherein a sheet is an edge-connected set of double-sided faces.

10. The method of claim 1, wherein the selected faces on the target body comprise multiple contiguous faces, and the incoming faces on the operator body comprise a single face.

11. The method of claim 1, wherein the selected faces on the target body comprise multiple discontinuous faces, and the incoming faces on the operator body comprise a single face.

12. The method of claim 1, wherein the selected faces on the target body comprise a single face, and the incoming faces on the operator body comprise a composite sheet.

13. The method of claim 1, wherein the selected faces on the target body comprise multiple continuous faces, and the incoming faces on the operator body comprise a single face within a composite sheet.

14. The method of claim 1, wherein one or mote remaining faces on the target body is extended, trimmed, or both trimmed and extended.

15. The method of claim 1, wherein the remaining faces on the target body which are adjacent to the selected faces on the target body are extended and/or trimmed using the incoming faces on the operator body.

16. An apparatus for modifying a solid body, comprising:
   a computer; and
   a solid modeling system, executed by the computer, for:
   (a) performing a replace face operation on a target body by selecting one or more outgoing faces on the target body and replacing the selected faces with one or more incoming faces from an operator body, the replace face operation comprising:
      identifying the outgoing faces of the target body;
      identifying all faces of the target body that are adjacent to the outgoing faces;
      building extension faces for the identified faces to a bounding box of the operator body;
      making the target body a sheet by making all faces double-sided;
      marking all the faces of the target body, the extension faces of the target body, and incoming and outgoing faces of the target body, and the incoming faces of the operator body with distinguishing attributes to identify the faces according to their origin and purpose;
      performing a non-regularized-unite on the outgoing faces of the target body, the incoming faces of the operator body, and the extension faces of the target body, in order to create a web body;
      simplifying the web body by eliminating the extension faces wherever possible by performing extension face culling;
      forming a universe body large enough to completely enclose the web body;
      generating a cellular topology graph (ct-graph) from the web body and the universe body;
      examining the ct-graph to determine what cells to keep and what cells to discard by performing cell culling, in order to create a final graph; and
      creating a final body from the final graph; and
   (b) storing or displaying the created final body.

17. The apparatus of claim 16, wherein the target body is a solid body.

18. The apparatus of claim 16, wherein the operator body is a sheet body.

19. The apparatus of claim 16, wherein the operator body is a solid body.

20. The apparatus of claim 16, wherein the selected faces on the target body comprise a single face.

21. The apparatus of claim 16, wherein the selected faces on the target body comprise a set of adjacent faces.

22. The apparatus of claim 16, wherein the selected faces on the target body comprise a set of disjoint faces.

23. The apparatus of claim 16, wherein the incoming faces on the operator body comprise a single double-sided face.

24. The apparatus of claim 16, wherein the incoming faces on the operator body comprise one or more sheets, wherein a sheet is an edge-connected set of double-sided faces.

25. The apparatus of claim 16, wherein the selected faces on the target body comprise multiple contiguous faces, and the incoming faces on the operator body comprise a single face.

26. The apparatus of claim 16, wherein the selected faces on the target body comprise multiple discontinuous faces, and the incoming faces on the operator body comprise a single face.

27. The apparatus of claim 16, wherein the selected faces on the target body comprise a single face, and the incoming faces on the operator body comprise a composite sheet.

28. The apparatus of claim 16, wherein the selected faces on the target body comprise multiple continuous faces, and the incoming faces on the operator body comprise a single face within a composite sheet.

29. The apparatus of claim 16, wherein one or more remaining faces on the target body is extended, trimmed, or both trimmed and extended.

30. The apparatus of claim 16, wherein the remaining faces on the target body which are adjacent to the selected faces on the target body are extended and/or trimmed using the incoming faces on the operator body.

31. An article of manufacture comprising a program storage device for storing instructions that, when read and executed by a computer, causes the computer to perform a method for modifying a solid body in a computer-implemented solid modeling system, comprising:
  (a) performing a replace face operation on a target body by selecting one or more outgoing faces on the target body and replacing the selected facts with one or more incoming faces from an operator body, the replace face operation comprising:
    identifying outgoing faces of the target body;
    identifying all faces of the target body that are adjacent to the outgoing faces;
    building extension faces for the identified faces to a bounding box of the operator body;
    making the target body a sheet by making all faces double-sided;
    marking all the faces of the target body, the extension faces of the target body, and incoming and outgoing faces of the target body and the operator body with distinguishing attributes to identify the faces according to their origin and purpose;
    performing a non-regularized-unite on the outgoing faces of the target body, the incoming faces of the operator body, and the extension faces of the target body, in order to create a web body;
    simplifying the web body by eliminating the extension faces wherever possible by performing extension face culling;
    forming a universe body large enough to completely enclose the web body;
    generating a cellular topology graph (ct-graph) from the web body and the universe body;
    examining the ct-graph to determine what cells to keep and what cells to discard by performing cell culling in order to create a final graph; and
    creating a final body from the final graph; and
  (b) storing or displaying the created final body.

32. The article of claim 31, wherein the target body is a solid body.

33. The article of claim 31, wherein the operator body is a sheet body.

34. The article of claim 31, wherein the operator body is a solid body.

35. The article of claim 31, wherein the selected faces on the target body comprise a single face.

36. The article of claim 31, wherein the selected faces on the target body comprise a set of adjacent faces.

37. The article of claim 31, wherein the selected faces on the target body comprise a set of disjoint faces.

38. The article of claim 31, wherein the incoming faces on the operator body comprise a single double-sided face.

39. The article of claim 31, wherein the incoming faces on the operator body comprise one or more sheets, wherein a sheet is an edge-connected set of double-sided faces.

40. The article of claim 31, wherein the selected faces on the target body comprise multiple contiguous faces, and the incoming faces on the operator body comprise a single face.

41. The article of claim 31, wherein the selected faces on the target body comprise multiple discontinuous faces, and the incoming faces on the operator body comprise a single face.

42. The article of claim 31, wherein the selected faces on the target body comprise a single face, and the incoming faces on the operator body comprise a composite sheet.

43. The article of claim 31, wherein the selected faces on the target body comprise multiple continuous faces, and the incoming faces on the operator body comprise a single face within a composite sheet.

44. The article of claim 31, wherein one or more remaining faces on the target body is extended, trimmed, or both trimmed and extended.

45. The article of claim 31, wherein the remaining faces on the target body which are adjacent to the selected faces on the target body are extended and/or trimmed using the incoming faces on the operator body.

* * * * *